(12) United States Patent
Inoue

(10) Patent No.: US 10,611,195 B2
(45) Date of Patent: Apr. 7, 2020

(54) TIRE BEAD FIBER

(71) Applicant: KB SEIREN, LTD., Fukui (JP)

(72) Inventor: Naoki Inoue, Fukui (JP)

(73) Assignee: KB SEIREN, LTD., Fukui (JP)

( * ) Notice: Subject to any disclaimer, the term of this patent is extended or adjusted under 35 U.S.C. 154(b) by 5 days.

(21) Appl. No.: 15/511,662

(22) PCT Filed: Jul. 27, 2016

(86) PCT No.: PCT/JP2016/072016
§ 371 (c)(1),
(2) Date: Mar. 16, 2017

(87) PCT Pub. No.: WO2017/022589
PCT Pub. Date: Feb. 9, 2017

(65) Prior Publication Data
US 2018/0134098 A1 May 17, 2018

(30) Foreign Application Priority Data

Jul. 31, 2015 (JP) .................................. 2015-151527

(51) Int. Cl.
| | | |
|---|---|---|
| *B60C 15/04* | (2006.01) | |
| *D02G 3/48* | (2006.01) | |
| *C08L 67/00* | (2006.01) | |
| *D01F 6/62* | (2006.01) | |
| *B60C 1/00* | (2006.01) | |

(52) U.S. Cl.
CPC .............. *B60C 15/04* (2013.01); *C08L 67/00* (2013.01); *D01F 6/62* (2013.01); *D02G 3/48* (2013.01); *B60C 2001/005* (2013.01); *B60C 2015/042* (2013.01); *B60C 2200/12* (2013.01); *D10B 2331/042* (2013.01); *D10B 2401/061* (2013.01)

(58) Field of Classification Search
CPC .............. D02G 3/48; B60C 15/04; D01F 6/62
See application file for complete search history.

(56) References Cited

U.S. PATENT DOCUMENTS

| | | | |
|---|---|---|---|
| 4,320,791 A | 3/1982 | Honda | |
| 4,378,042 A | 3/1983 | Inae | |
| 2011/0318982 A1* | 12/2011 | Funatsu | C09K 19/3809 442/49 |
| 2015/0111677 A1* | 4/2015 | Nishiyama | F16G 1/10 474/264 |
| 2015/0133250 A1* | 5/2015 | Wu | B29C 43/305 474/261 |
| 2018/0187337 A1* | 7/2018 | Iseki | D01F 6/70 |

FOREIGN PATENT DOCUMENTS

| | | |
|---|---|---|
| EP | 0267984 | 5/1988 |
| EP | 1818190 | 8/2007 |
| JP | S56-43010 | 4/1981 |
| JP | 63-134307 | 6/1988 |
| JP | S63-256738 | 10/1988 |
| JP | 64-077640 | 3/1989 |
| JP | H06-143914 | 5/1994 |
| JP | H06-286426 | 10/1994 |
| JP | H07-329520 | 12/1995 |
| JP | 09-315108 | 12/1997 |
| JP | 10-095211 | 4/1998 |
| JP | 3-412892 | 6/2003 |
| JP | 2015030920 | 2/2015 |

OTHER PUBLICATIONS

International Search Report in international application No. PCT/JP2016/072016 dated Sep. 20, 2016.
Extended Search Report in corresponding European application No. 16832868.0 dated Mar. 21, 2018.

\* cited by examiner

*Primary Examiner* — Shaun R Hurley
(74) *Attorney, Agent, or Firm* — Kirschstein, Israel, Schiffmiller & Pieroni, P.C.

(57) ABSTRACT

Provided is bead fiber with which sufficient air volume can be infused for making a high-performance bicycle tire, which has superior workability that does not require drying of the bead fibers when covering the bead fibers with rubber, and which is effective in preventing rim detachment. A high-performance bicycle tire can be obtained by using this tire bead fiber. The tire bead fiber is characterized by being formed using wholly aromatic polyester fiber with a modulus of elasticity of 800 cN/dt or greater.

2 Claims, 1 Drawing Sheet

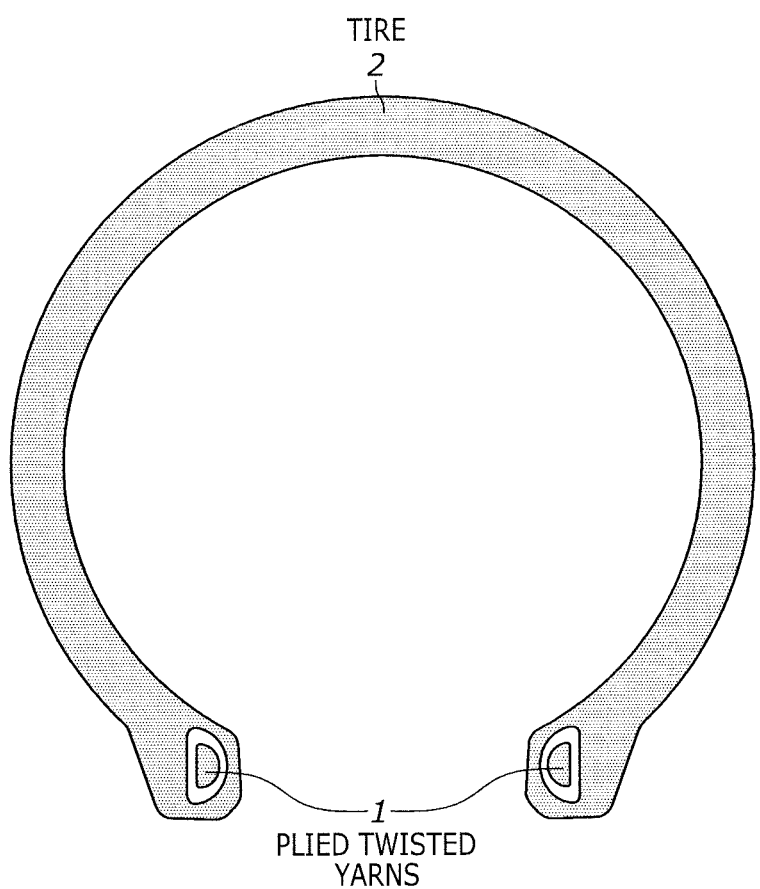

TIRE BEAD FIBER

TECHNICAL FIELD

The present invention relates to a bead fiber for pneumatic tires used for bicycles.

BACKGROUND ART

The performance required for bicycle tires significantly differs depending on the driving environment and purpose. For example, lightweight is considered essential for tires of bicycles such as road bikes or the like, and it has been known to aim at reducing vibration by increasing air volume.

In order to satisfy the air volume sufficient for those bicycle tires including road bike tires, it is necessary to prevent rim detachment. The air volume in the bicycle tires including road bike tires is preferably 1500 kPa or more in accordance with the water pressure test for bicycle tire rim running-off resistance described in JIS K 6302.

Hence, for the purpose of reducing weight of a bicycle tire, it is known that a high-strength organic fiber is used as a bead fiber to be used in a bead portion which is a mating portion between a bicycle tire and a rim.

For example, Patent Document 1 proposes that a high-strength wholly aromatic polyester fiber is used as a bead fiber which is lightweight and easy to handle.

In Patent Document 2, the bead fiber that may be used includes a para-aramid fiber such as "Technora" (registered trademark) produced by Teijin Limited and "Kevlar" (registered trademark) produced by DuPont; high-strength polyethylene, and the like. Patent Document 2 proposes that of these, a para-aramid fiber is preferred.

PRIOR ART DOCUMENTS

Patent Documents

Patent Document 1: JP-A-64-77640
Patent Document 2: JP-A-10-95211

SUMMARY OF THE INVENTION

Problems to Be Solved By the Invention

However, even though a high-strength fiber is employed to beads, sufficient air volume has not been always obtained.

In addition, the para-aramid fiber such as Technora or Kevlar absorbs water in some cases, so that when used as a bead fiber to be covered with rubber, the water absorption ratio of the para-aramid fiber has needed to be controlled by heating the fiber with a preheater or the like before use, or by other procedure, from the viewpoint of deterioration of rubber.

An object of the present invention is to provide a bead fiber which allows sufficient air volume to be infused, has excellent processability when covered with rubber, and is effective in preventing rim detachment.

Means for Solving the Problems

As the result of intensive studies to solve the problems, the present inventors have found that air volume and elastic modulus of the organic fiber are significantly related to each other. The present invention has been accomplished thereby.

Specifically, the object of the present invention is achieved by a bead fiber containing a wholly aromatic polyester fiber having an elastic modulus of 800 cN/dtex or more.

In the tire bead fiber of the present invention, it is preferable that the wholly aromatic polyester fiber be used as a twisted yarn.

It is also preferable that the twisted yarn be a plied yarn, having a second twist coefficient of 20 or less and a first twist coefficient of 30 or less.

Effect of the Invention

According to the present invention, there can be obtained a head fiber with which air volume in a bicycle tire can be effectively increased, that is excellent in processability because the bead fiber does not need to be dried when covered with rubber, and that is effective in preventing rim detachment. Therefore, the use of the tire bead fiber of the present invention can provide a high-performance bicycle tire.

BRIEF DESCRIPTION OF THE DRAWING

FIG. 1 is a schematic view illustrating a cross-section of a bicycle tire in accordance with an embodiment of the present invention.

MODE FOR CARRYING OUT THE INVENTION

The wholly aromatic polyester fiber used in the present invention is formed from a wholly aromatic polyester-based polymer.

The wholly aromatic polyester-based polymer is a polymer made up of an aromatic dicarboxylic acid, an aromatic diol and/or an aromatic hydroxycarboxylic acid, or derivatives thereof, and includes, in some cases, copolymers of the foregoing with an alicyclic dicarboxylic acid, an alicyclic diol, an aliphatic diol, or derivatives thereof. Examples of the aromatic dicarboxylic acid as used herein include terephthalic acid, isophthalic acid, 4,4'-dicarboxydiphenyl, 2,6-dicarboxynaphthalene, 1,2-bis(4-carboxyphenoxy)ethane, and nuclear-substituted forms thereof that have been substituted with an alkyl, aryl, alkoxy or halogen group. Examples of the aromatic diol include hydroquinone, resorcin, 4,4'-dihydroxydiphenyl, 4,4'-dihydroxybenzophenone, 4,4'-dihydroxydiphenylmethane, 4,4'-dihydroxydiphenylethane, 2,2-bis(4-hydroxyphenyl)propane, 4,4'-dihydroxydiphenylether, 4,4'-dihydroxydiphenylsulfone, 4,4'-dihydroxydiphenylsulfide, 2,6-dihydroxynaphthalene, 1,5-dihydroxynaphthalene, and nuclear-substituted firms thereof that have been substituted with an alkyl, aryl, alkoxy or halogen group. Examples of the aromatic hydroxycarboxylic acid include p-hydroxybenzoic acid, m-hydroxybenzoic acid, 2-hydroxynaphthalene-6-carboxylic acid, 1-hydroxynaphthalene-5-carboxylic acid, and nuclear-substituted forms thereof that have been substituted with an alkyl, aryl, alkoxy or halogen group. Examples of the alicyclic dicarboxylic acid include trans-1,4-dicarboxycyclohexane, cis-1,4-dicarboxycyclohexane, and nuclear-substituted forms thereof that have been substituted with an alkyl, aryl or halogen group. Examples of the alicyclic or aliphatic diol include trans-1,4-dihydroxycyclohexane, cis-1,4-dihydroxycyclohexane, ethylene glycol, 1,4-butanediol, and xylylenediol.

Of these combinations, examples of a wholly aromatic polyester-based polymer preferred in the present invention include (a) a copolyester made up of 40 to 70 mol % of a p-hydroxybenzoic acid residue, 15 to 30 mol % of a residue of the aromatic dicarboxylic acid, and 15 to 30 mol % of an aromatic diol residue, (b) a copolyester made up of terephthalic acid and/or isophthalic acid and chlorohydroquinone, phenylhydroquinone, and/or hydroquinone, (c) a copolyester made up of 20 to 80 mol % of a p-hydroxybenzoic acid residue and 20 to 80 mol % of 2-hydroxynaphthalene-6-carboxylic acid residue.

To obtain a wholly aromatic polyester-based polymer to be used in the present invention using the starting materials, the materials are subjected to a polycondensation reaction directly or by esterification using an aliphatic or aromatic monocarboxylic acid or derivatives thereof, an aliphatic alcohol, phenols, or derivatives thereof, or the like. Bulk polymerization, solution polymerization, suspension polymerization, or the like, each known in the art can be employed as the polycondensation reaction, and the resulting polymer is used as a sample for spinning, directly or after being heat-treated in a powdery form in an inert gas or under reduced pressure. Alternatively, it may be used after being once granulated with an extruder.

The component may contain other polymers or additives (e.g., pigments, carbon black, heat stabilizers, ultraviolet absorbers, lubricants, and fluorescent brighteners) as long as it is substantially free from deterioration in tenacity thereof.

The wholly aromatic polyester-based polymer in the present invention has a molecular weight range suitable for spinning. A "flow onset temperature" is used as a value of a physical property that corresponds to a molecular weight suitable for the melt spinning conditions. The "flow onset temperature" is defined by a temperature at which, when the temperature of an aromatic polyester sample is raised at a rate of 4° C./min under a pressure of 100 kg/cm$^2$ in a nozzle of 1 mm in inner diameter and 10 mm in length by using a flow tester CFT-500 manufactured by Shimadzu Corporation, the sample flows through the nozzle and gives an apparent viscosity of 4,800 Pa·s In the present invention, the "flow onset temperature" of a wholly aromatic polyester-based polymer suitable for melt spinning is preferably 305 to 325° C.

The production of the wholly aromatic polyester fiber to be used in the present invention may be performed using a melt extrusion method known in the art.

The wholly aromatic polyester fiber to be used in the present invention needs to have an elastic modulus of 800 cN/dtex or more. The use of the fiber having an elastic modulus of 800 cN/dtex or more can prevent rim detachment and achieve higher air volume.

The upper limit of the elastic modulus is not particularly limited as long as the effects of the present invention can be achieved, and is, for example, appropriately 1200 cN/dtex or less.

In the wholly aromatic polyester fiber to be used in the present invention, the number of filaments and the total fineness may be appropriately set so as to achieve the object of the present invention.

The wholly aromatic polyester fiber has a total fineness of preferably 110 to 11000 dtex, and more preferably 3300 to 9900 dtex. Such fiber is also preferably in the form of a multifilament.

The elongation of the wholly aromatic polyester fiber to be used in the present invention is preferably from 2 to 10%, and the strength thereof is preferably from 15 to 30 cN/dtex.

The wholly aromatic polyester fiber to be used in the present invention can be used as raw yarn or preferably in the form of a twisted yarn, as the bead fiber.

In the case of the twisted yarn, the number of twist is not particularly limited, and the twist coefficient is preferably 100 or less in accordance with the following equation:

$$K=T\times\sqrt{D}/100$$

(twist coefficient K, fineness: D (dtex), number of twists: T (T/m))

The twisted yarn may be a single-twisted yarn or a plied yarn. In particular, a plied yarn is preferably used. A bead fiber for bicycles requires circularity, and to meet the requirement, the bead fiber needs to have a certain number of twists. Increased number of twists, however, increases the torque, so that a plied yarn may be suitable in order to reduce the torque. The smaller torque does not cause waving of the head fiber (twisted yarn) in the tire, which is, preferable.

In the case of using the plied yarn, it is preferable that a second twist coefficient be 20 or less and a first twist coefficient be 30 or less. It is also preferable that the second twist coefficient be 1 or more and the first twist coefficient be 1 or more.

Further, in the case of using the plied yarn, as for the numbers of first and second twists, the number of second twists/the number of first twists results in preferably from 0.55 to 0.85, and in particular, more preferably from 0.7 to 0.8.

The wholly aromatic polyester fiber used in the present invention may be processed with a component having adhesiveness.

In addition, a coating may be applied to the wholly aromatic polyester fiber used in the present invention.

The bead fiber of the present invention is appropriately used as a desired bicycle tire bead by a conventional method. As a result, air volume in the bicycle tire can be effectively increased and a high-performance bicycle tire can be obtained.

EXAMPLES

The present invention is specifically described by the following examples.

The individual evaluations in the examples were performed as described below.

1) Strength, elongation, and elastic modulus of bead fiber

Strength at break, elongation at break, and elastic modulus (initial tensile resistance) were measured at a sample length of 200 mm and a tensile rate of 200 mm/min by using a tensile tester (manufactured by Shimadzu Corporation, AGS-500NX) in accordance with the standard condition test of JIS L 1013 (2010).

2) Water absorption ratio of polymer

Official moisture regain in accordance with JIS L 0105.

3) Processability of bead fiber

The case where drying was not required at the time of covering with rubber was evaluated as "○", and the case where drying was required was evaluated as "Δ".

4) Water pressure resistance

Water pressure test for tire rim running-off resistance described in JIS K 6302.

5) Finished quality

The case where the bead fiber (plied yarn) in the tire was especially good without waving was evaluated as ⊙, the case where such condition was good was evaluated as "○", and the case where some waving was present was evaluated as "Δ".

Example 1

A wholly aromatic polyester fiber "Zxion" (registered trademark) produced by KB SEIREN CO., LTD., Type-MS, 3300 dtex/288 f, single fiber fineness: 115 dtex, strength: 21 cN/dtex, elongation: 3%, and elastic modulus: 850 cN/dtex) was twisted in a Z direction so as to have a number of twists of 20 T/m, to thereby obtain a bead fiber.

The bead fiber was annularly wrapped around three times in a tire circumference direction to form an annular body. The annular body having a bundle of the bead fibers was covered with rubber to thereby prepare a bicycle tire (700× 23 C). The cross-section of the tire is illustrated in FIG. 1.

The water pressure resistance of the bicycle tire thus obtained was evaluated.

The results were shown in Table 1 together.

Example 2

A tire was prepared in the same manner as in Example 1 except that the bead fiber had a number of twists of 45 T/m.

Example 3

The bead fibers of Example 1 were used as first twisted yarns, and three plied yarns were twisted with the number of second twists of 15 T/m in an S direction to form an annular body. The annular body was then covered with rubber to prepare a tire.

Comparative Example 1

A tire was prepared in the same manner as in Example 1 except that "Zxion" (registered trademark) produced by KB SEIREN CO., LTD., Type-VS, 3300 dtex/288 f, single fiber fineness: 11.5 dtex, strength: 21 cN/dtex, elongation: 3%, and elastic modulus: 600 cN/dtex) was used.

Comparative Example 2

A tire was prepared in the same manner as in Comparative Example 1 except that "Zxion" (registered trademark) produced by KB SEIREN CO., LTD., Type-VS, 3300 dtex/672 f, single fiber fineness: 4.9 dtex, strength: 21 cN/dtex, elongation: 3%, and elastic modulus: 600 cN/dtex) was used.

Comparative Example 3

A tire was prepared in the same manner as in Comparative Example 1 except that "Zxion" (registered trademark) produced by KB SEIREN CO., LTD., Type-TS, 3300 dtex/672 f, single fiber fineness: 4.9 dtex, strength: 28 cN/dtex, elongation: 3%, and elastic modulus: 600 cN/dtex) was used.

Comparative Example 4

A tire was prepared in the same manner as in Comparative Example 1 except that "Zxion" (registered trademark) produced by KB SEIREN CO., LTD., Type-TS, 3300 dtex/672 f, single fiber fineness: 4.9 dtex, strength: 28 cN/dtex, elongation: 3%, and elastic modulus: 500 cN/dtex) was used.

Comparative Example 5

A tire was prepared in the same manner as in Comparative Example 1 except that "Kevlar" (registered trademark) produced by DU PONT-TORAY CO., LTD., 3300 dtex/2040 f, single fiber fineness: 1.6 dtex, strength: 21 cN/dtex, elongation: 2:4%, and elastic modulus: 700 cN/dtex) was used.

TABLE 1

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Fineness (dtex) | 3300 | 3300 | 3300 | 3300 | 3300 | 3300 | 3300 | 3300 |
| No. of filaments | 288 | 288 | 288 | 288 | 672 | 672 | 672 | 2040 |
| No. of twists (t/m) | 20 | 45 | First: 20 Second: 15 | 20 | 20 | 20 | 20 | 20 |
| Strength (cN/dt) | 21 | 21 | 21 | 21 | 21 | 28 | 28 | 21 |
| Elongation (%) | 3 | 3 | 3 | 3 | 3 | 3 | 3 | 2 |
| Elastic modulus (cN/dt) | 900 | 850 | 850 | 600 | 600 | 600 | 500 | 700 |
| Water absorption ratio (%) | >0.01 | >0.01 | >0.01 | >0.01 | >0.01 | >0.01 | >0.01 | 4 |
| Processability | ○ | ○ | ○ | ○ | ○ | ○ | ○ | Δ |
| Water pressure resistance (kPa) | 2000 | 1900 | 1900 | 900 | 900 | 900 | 700 | 1400 |
| Finished quality | ○ | ○ | ◉ | ○ | ○ | ○ | ○ | ○ |

INDUSTRIAL APPLICABILITY

The bead fiber of the present invention can be suitably used for bicycle tires or the like.

DESCRIPTION OF REFERENCE SIGNS

1. Bead fibers
2. Bicycle tire

The invention claimed is:
1. A tire bead fiber, comprising:
a wholly aromatic polyester fiber having an elastic modulus of 800 cN/dtex or more and being a twisted yarn, wherein the twisted yarn is a plied yarn having a second twist coefficient of 20 or less, and a first twist coefficient of 30 or less, and
wherein a number of second twists divided by a number of first twists ranges from 0.55 to 0.85.
2. The tire bead fiber according to claim 1, wherein the number of second twists divided by the number of first twists ranges from 0.7 to 0.8.

* * * * *